(12) United States Patent
Wooldridge et al.

(10) Patent No.: US 10,643,026 B2
(45) Date of Patent: May 5, 2020

(54) USER ACTIVITY TRACKING IN THIRD-PARTY ONLINE SYSTEMS

(71) Applicant: Facebook, Inc., Menlo Park, CA (US)

(72) Inventors: Tobias Henry Wooldridge, Seattle, WA (US); Christine Jinha Hwang, La Crescenta, CA (US); Aleksey Sergeyevich Fadeev, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 267 days.

(21) Appl. No.: 15/839,738

(22) Filed: Dec. 12, 2017

(65) Prior Publication Data
US 2019/0179884 A1    Jun. 13, 2019

(51) Int. Cl.
| | |
|---|---|
| G06F 17/00 | (2019.01) |
| G06F 40/174 | (2020.01) |
| H04L 29/06 | (2006.01) |
| G06Q 30/06 | (2012.01) |
| G06Q 50/00 | (2012.01) |
| G06F 3/01 | (2006.01) |
| G06F 16/22 | (2019.01) |
| G06F 40/14 | (2020.01) |

(52) U.S. Cl.
CPC ............ *G06F 40/174* (2020.01); *G06F 3/011* (2013.01); *G06F 16/2255* (2019.01); *G06F 40/14* (2020.01); *G06Q 30/0613* (2013.01); *G06Q 30/0633* (2013.01); *G06Q 30/0641* (2013.01); *G06Q 50/01* (2013.01); *H04L 63/0407* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 9,509,768 B2* | 11/2016 | Ormseth | ........... H04L 67/22 |
| 9,553,918 B1* | 1/2017 | Manion | ........... G06F 16/00 |
| 2002/0062342 A1* | 5/2002 | Sidles | ........... G06F 17/243 709/203 |
| 2015/0058393 A1* | 2/2015 | Smith | ........... H04L 67/10 709/201 |
| 2015/0326651 A1* | 11/2015 | Ormseth | ........... H04L 67/22 709/204 |
| 2015/0332316 A1* | 11/2015 | Cohen Kassko | .. G06Q 30/0243 705/14.45 |
| 2016/0092914 A1* | 3/2016 | Wiener | ........... G06Q 30/0246 705/14.45 |

(Continued)

Primary Examiner — Mustafa A Amin
(74) Attorney, Agent, or Firm — Fenwick & West LLP (57) ABSTRACT

Disclosed is a method for identifying an action performed by a user in a third party system. Information associated with a form is received by an online system. For instance, hashed values of a plurality of form fields provided by a user and a description of the plurality of form fields are received by an online system. A form is identified based on the received information. Additionally, a determination whether one or more of the received hashed values correspond to stored values by the online system is made. If the received hashed values correspond to stored values in the online system, a user of the online system is identified based on the stored values corresponding to the one or more received hashed values. An identification of an action associated with the identified form and performed by the user in the third party system is stored.

20 Claims, 5 Drawing Sheets

(56) References Cited

U.S. PATENT DOCUMENTS

2016/0359989 A1* 12/2016 Aycock .................. H04L 67/22
2017/0324626 A9* 11/2017 Bruich .................... H04L 65/40
2017/0351733 A1* 12/2017 Zhou ................... G06F 21/6254

* cited by examiner

| Field | Plain Text | Hashed Value |
|---|---|---|
| UserID: | 1406540 | 8868E550B9A617CD91F40C46023B4F9F02460F2F |
| Name: | Joe Doe | 8F1F38467DC2A78C05DCC98C5E0D20F0B5AEA8AA |
| Email: | user1@email.com | 163EED51EA1A1DE7792D92D8953112043G330420 |
| Address: | 123 A street | FB02CFA565A2F6062E158FA8F5FCFE17624F8B8A |
| Phone: | (555) 555-1230 | 0AEA7C99C24D91FB91B368873DC6A1B2ACDA7808 |
| Birthday: | 12/04/1987 | |

310A

| Field | Plain Text | Hashed Value |
|---|---|---|
| UserID: | 1406541 | CAC7BBB6B67B44EA0AB997D34A88E4EA9B4D3D62 |
| Name: | Jane Doe | 84E1DD98531DD50F3C838411B2CE46621CA458B1 |
| Email: | user2@email.com | CD50F64E7A1ED03123C3D024B0D40EA46AE24244 |
| Address: | 8173 B avenue | DAADE23051793D6CBC631B266601DACC2A11B0F7 |
| Phone: | (555) 555-4567 | 113A0622EA103762EEFE079722D4DBB4FDA7719E |
| Birthday: | 02/13/1998 | |

310B

| Field | Plain Text | Hashed Value |
|---|---|---|
| UserID: | 1406542 | 978168D5FD4D89A93ABE2E1DF8DA3FB741297FB0 |
| Name: | James Smith | AE78AAA41261547928338FF6EFCE571F0939C545A |
| Email: | jsmith@email.com | F856DDFFCD15336 9136AE8C93F86DECCB152DF43 |
| Address: | 507 C blvd. | 3A9A79D712E1CE505258CC51E57A8302B0DC20CF |
| Phone: | (555) 555-0248 | A08B1F25C834FEF6E462A26569769 9819 31B2B76 |
| Birthday: | 09/25/2002 | |

| Name | Joe Doe | — 410A |
| Email | user1@email.com | — 410B |
| Address | 123 A street | — 410C |
| Phone | (555) 555-1230 | — 410D |
| Birthday | 12 04 1987 ▽ | — 410E |

420B — Cancel    Submit — 420A

| | | |
|---|---|---|
| 450A | Host: | www.thirdparty.com — 460A |
| 450B | Form: | Submit — 460B |
| 450C | Name: | 8868E550B9A617CD91F40C46023B4F9F02460F2F — 470A |
| 450D | Email: | 8F1F38467DC2A78C05DCC98C5E0D20F0B5AEA8AA — 470B |
| 450E | Address: | 163EED51EA1A1DE7792D92D895311204363304 20 — 470C |
| 450F | Phone: | FB02CFA565A2F6062E158FA8F5FCFE17624F8B8A — 470D |
| 450G | Birthday: | 0AEA7C99C24D91FB91B368873DC6A1B2ACDA7808 — 470E |

FIG. 4C

| | | |
|---|---|---|
| 450A | Host: | www.thirdparty.com — 460A |
| 450B | Form: | Submit — 460B |
| 450C | Field1: | 8868E550B9A617CD91F40C46023B4F9F02460F2F — 470A |
| 450D | Field2: | 8F1F38467DC2A78C05DCC98C5E0D20F0B5AEA8AA — 470B |
| 450E | Field3: | 163EED51EA1A1DE7792D92D895311204363304 20 — 470C |
| 450F | Field4: | FB02CFA565A2F6062E158FA8F5FCFE17624F8B8A — 470D |
| 450G | Field5: | 0AEA7C99C24D91FB91B368873DC6A1B2ACDA7808 — 470E |

USER ACTIVITY TRACKING IN THIRD-PARTY ONLINE SYSTEMS

BACKGROUND

Field of the Disclosure

This disclosure relates generally to identifying user activity in third party systems, and more specifically to verifying that a reported information by a third party system is descriptive of a user's action.

Description of the Related Art

Online systems use tracking pixels to track user activity in third party systems. The online systems using those tracking pixels rely on the third party systems to correctly set up and use the tracking pixels to be able to obtain accurate information. Oftentimes, third party systems do not use the tracking pixels as intended and thus, the information gathered by the online system may be inaccurate.

For example, a third party webpage may configure a tracking pixel that is intended for tracking user purchases in the third party website to activate or perform specific actions when users place a product in a shopping cart. When the user clicks an "add to cart" button of the third party website, a script associated with the "add to cart" button is run, which sends a request for a specific object stored in a predefined location of an online system. The online system may have different objects stored in different location, each object related to a different action, user, or third party website. As such, the online system gets a notification each time a user places an item in a shopping cart indicating that the user has purchased the product. Since in this case, the user has simply placed the product in the shopping cart, the user may remove the product from the shopping cart without actually purchasing it. Thus, the purchase information gathered by the online system may be inaccurate because the pixel does not accurately reflect the user behavior.

SUMMARY

To increase the accuracy of the information received for a tracking pixel, the online system generates a script that is embedded in third party systems. The script causes a user device to transmit encrypted information to the online system, from which the online system may determine an action that was performed by the user in the third party system. This action determined by the script information may verify the information provided by the tracking pixel. The information sent to the online system is encrypted such that the identification of the user may not be determined. To identify the user associated with the encrypted information, the online system performs the same encrypting function to the information available to the online system and compares the received encrypted information with the encrypted information available to the online system. If a user is identified, the action performed by the user in the third party system is stored in the identified user's profile.

Moreover, based on the information received from the third party system, the online system may generate a dictionary of forms. If a user is identified by comparing the received encrypted information with the encrypted information available to the online system, the online system identifies a type of the information of the received encrypted information. The type of the received encrypted information is identified by identifying a type of the matching encrypted information available to the online system. In some embodiments, the dictionary of forms is used to aid other users in filling out the forms of the third party system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
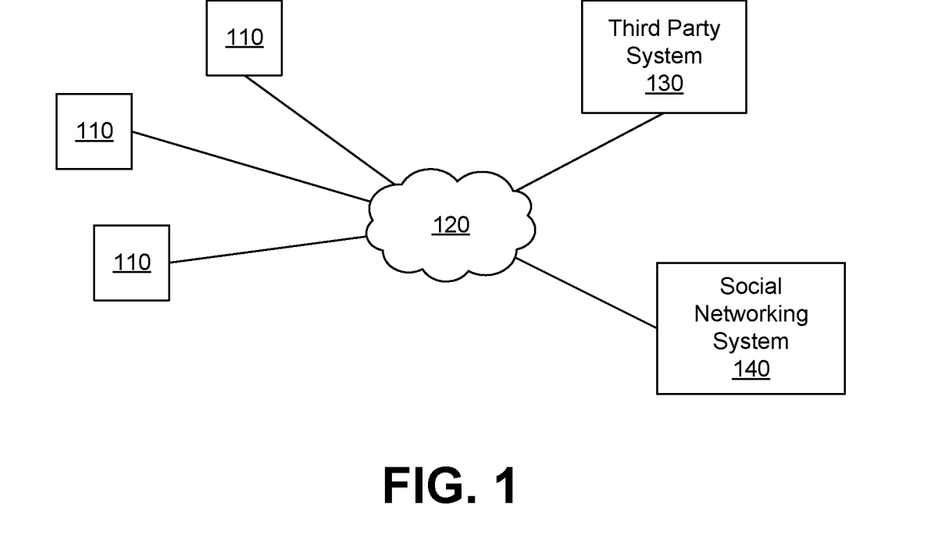
FIG. 1 is a block diagram of a system environment in which an online system operates, in accordance with an embodiment.

FIG. 1 is a block diagram of a system environment 100 for an online system 140.

The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
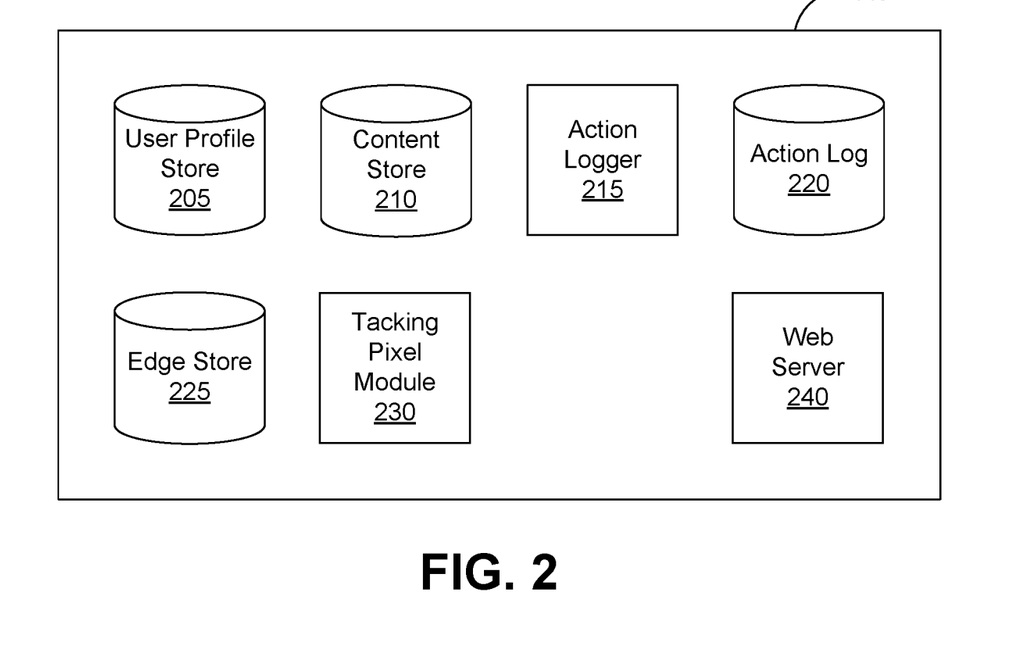
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a tracking pixel module 230, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

Figure 3:
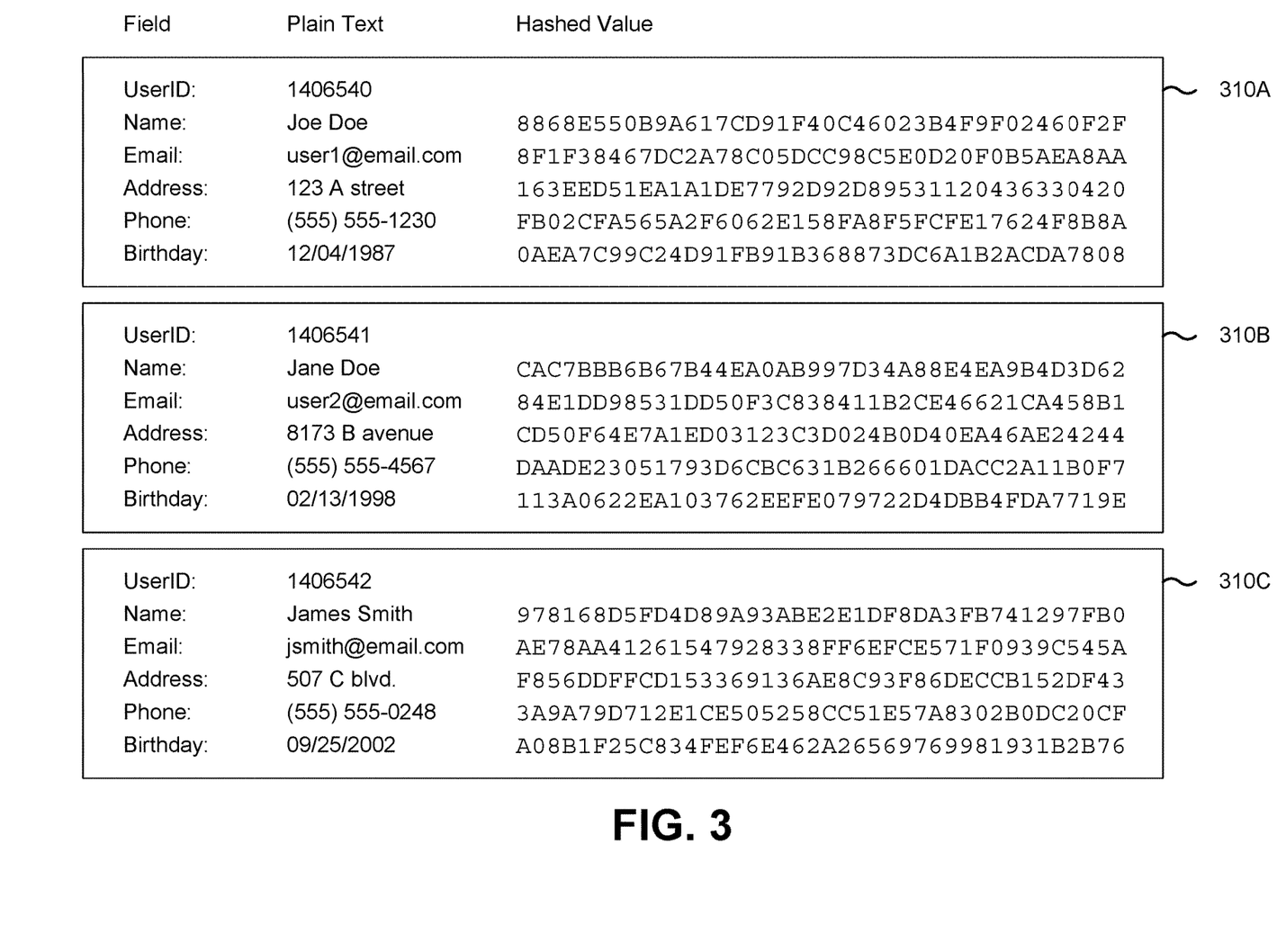
FIG. 3 illustrates an example of the user profile for three users, according to one embodiment.

FIG. 3 illustrates an example of the user profile for three users, according to one embodiment. In the example of FIG. 3, the user profiles include a userID field, a name field, an email address field, an address field, a phone number field, and a birthday field. The user profiles 310 store plain text values or encrypted values of the information provided by the user. In some embodiments, the user profiles 310 store hashed values of at least a subset of fields. For instance, in the example of FIG. 3, the user profiles 310 store hashed values of the users' name, email address, address, phone numbers, and birthday.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups, or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile, and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The tracking pixel module 230 identifies activity that a user of the online system 140 has performed in a third party system 130. For instance, the tracking pixel module 230 identifies users that complete purchases in an online market place.

In one embodiment, the third party system uses a tracking pixel or piece of HTML code placed by the third party system on third-party websites to monitor users visiting the websites that have not opted out of tracking. A tracking pixel might be included on various pages, including on a product page describing a product, on a shopping cart page that the user visits upon putting something into a shopping cart, on a checkout page that the user visits to checkout and purchase a product, etc. For example, a tracking pixel results in a transparent 1×1 image, an iframe, or other suitable object being created for third party pages. When a user's browser loads a page having the tracking pixel, the tracking pixel results in the user's browser attempting to retrieve the content for that pixel, and the browser contacts the online system to retrieve the content. The request sent to the online system, however, actually includes various data about the user's actions taken on the third party website. The third party website can control what data is sent to the online system. For example, the third party system may include information about the page the user is loading (e.g., is it a product page, a shopping cart page, a checkout page, etc.), about information on the page or about a product on the page of interest to the user (e.g., the SKU number of the product, the color, the size, the style, the current price, any discounts offered, the number of products requested, etc.), about the user (e.g., the third party's user identifier (UID) for the user, contact information for the user, etc.), and other data. In some embodiments, a cookie set by the online system can also be retrieved by the online system, which can include various data about the user, such as the online systems' UID for the user, information about the client device and the browser, such as the Internet Protocol (IP) address of the client device, among other data. Tracking can also be performed on mobile applications of content providers by using a software development kit (SDK) of the online system or via an application programming interface (API) of the online system to track events (e.g., purchases) that occur by users on the content provider's app that are reported to the online system.

The online system can then use this data received about the user to serve better content to the user in the future (e.g., since the online system has further data about products purchased or browsed that might be of interest), and can also use this in retargeting of that product to the user (e.g., where the user went to the product page on the third party site by clicking on an of the third party presented to the user in the online system). The online system can also use this data in conversion tracking and reporting results of advertising campaigns to the third party. For example, if the third party has spent money at the online system to have the online system serve ads for its products, and a particular user views an ad on the online system and then purchases the product advertised (possibly at some point later, and possibly on a different device), the online system can link the purchase/conversion to the ad originally shown on the online system. Thus, the online system can include this data in its reporting to the third party system of how many conversions were related to the ad campaign.

In some embodiments, the tracking pixel is a script that is embedded in the web pages of the third party system 130. The script is generated by the online system 140 and causes users of the web pages of the third party system to transmit encrypted information to the online system 140. In some embodiments, the encryption algorithm used by the script does not allow the online system 140 to decrypt the encrypted information. For instance, the encryption algorithm is a non-invertible (or "one-way") hash function (e.g., MD5 or SHA-1) for which it is infeasible to recover the originally value from the encrypted information. The script may further transmit information that identifies the third party system or specific portions of the third party system. In some embodiments, the information that identifies the third party system 130 is not encrypted, or is encrypted using an encrypting algorithm that is decryptable by the online system 140.

The information sent to the online system 140 by the tracking pixel may be in response to a user of the third party system submitting an online form. For example, the tracking pixel is configured to execute when the user presses the "Submit" button or the "Purchase" button of a web page of the third party system 130. The script then sends information related to the form such as an identification of the form and the values filled by the user to the online system 140. In some embodiment, as described below, the script modifies or edits the information related to the form to protect the user's privacy. For instance, instead of sending a plain text version of the information related to the forms, the script sends a hashed or encrypted version of the information.

Figure 4A:
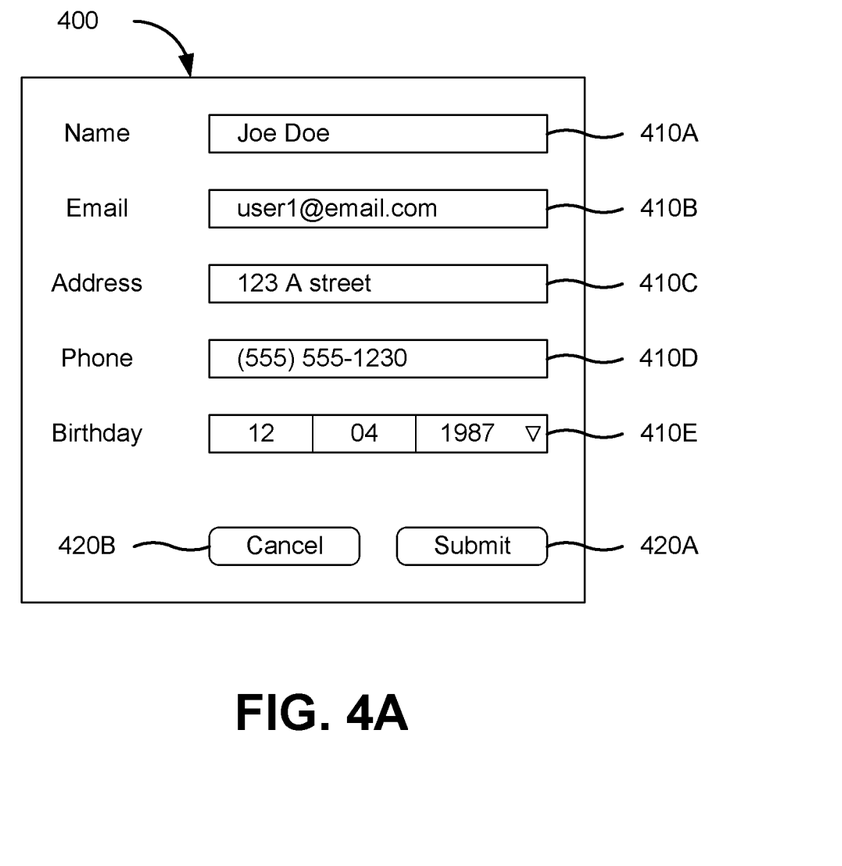
FIG. 4A illustrates an example of a form 400 filled by a user of a third party system, according to an embodiment.

In some embodiments, the tracking pixel module 130 receives information related to forms filled in a third party system. For instance, the tracking pixel module 130 receives information related to a form in a checkout page in an online market place. FIG. 4A illustrates an example of a form 400 filled by a user of a third party system, according to an embodiment. The form 400 includes form fields 410A through 410E and buttons 420A and 420B. Form field 410A is a text box for a user to enter the user's name. In the example of FIG. 4A, the user has entered the name "Joe Doe." Form field 410B is a text box for a user to enter an email address. In the example of FIG. 4A, the user has entered the email address "user1@email.com." Form field 410C is a text box for a user to enter an address. In the example of FIG. 4A, the user has entered the address "123 A street." Form field 410D is a text box for a user to enter a phone number. In the example of FIG. 4A, the user has entered the phone number "(555) 555-1230." Form field 410E is a dropdown box for entering a date, in particular, a birthday of the user. In the example of FIG. 4A, the user has entered the date "Dec. 4, 1987."

Moreover, button 420A is a submit button and button 430 is a cancel button. In some embodiments, the cancel button 420B clears form fields 410. In other embodiments, the cancel button 420B takes the user to a different web page. The submit button 420A provides the values inputted by the user in the form fields 410 to the third party system 130. Furthermore, the submit button causes the client device to perform additional actions, such as providing information to the online system 140.

Figure 4B:
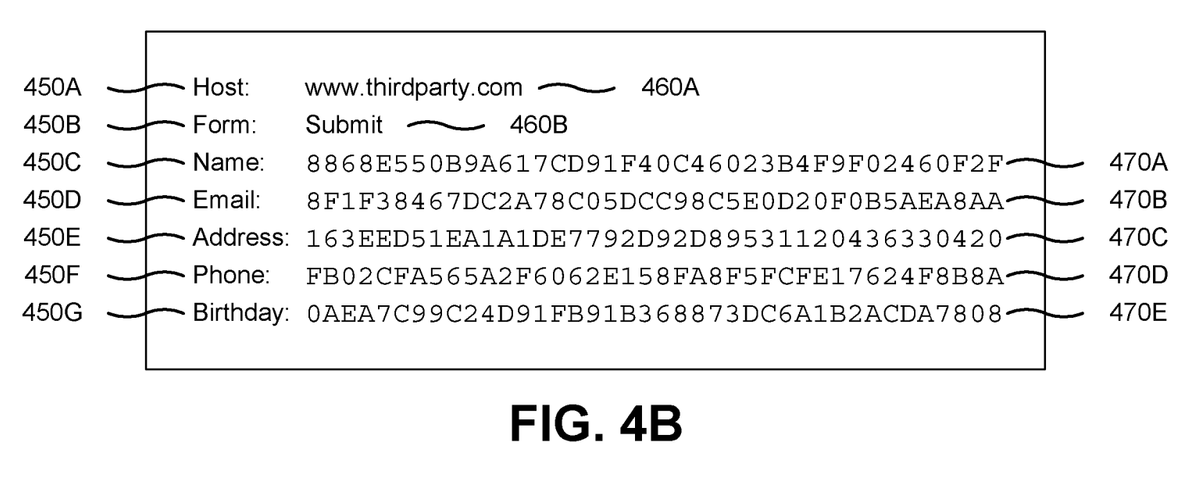
FIG. 4B illustrates a set of values sent to the online system in response to a user submitting a form in a third party system, according to one embodiment.

In the example of FIG. 4A, after the user presses submit button 420A, the information shown in FIG. 4B is sent to the online system 140. In some embodiments, the information is sent to the online system 140 by the client device of the user visiting the third party system 130. In other embodiments, the information is sent to the online system 140 by the third party system 130. The information sent to the online system 140 includes information identifying the third party system 460, a name 450 for each of the form fields, and hashed values of the information provided by the user 470. The hashed version of the information provided by the user is sent instead of the plain text version to protect the privacy of the user. That is, after receiving the hashed version of the information provided by the user, the online system is not able to retrieve the plain text form of the information. Furthermore, if another entity intercepts the communication between the third party system 130 and the online system 140, the entity that intercepted the communication is also not able to retrieve the plain text form of the information. In the example of FIG. 4A, the information sent to the online system 140 includes the URL 460A of the third party system 130 "www.thirdparty.com," information identifying the form 460B within the third party system 130 the user has filled out, and hashed versions of the information entered in the form fields 410 of form 400. In the example of FIG. 4B, the secure hash algorithm 1 (SHA-1) was used to hash the information entered in form fields 410. As such, instead of receiving "Joe Doe" as the name entered in the name text box 410A, the hashed version "978168D5FD4D89A93ABE2E1DF8DA3FB741297FB0" is received. In some embodiments, the hash function is a non-invertible function. That is, a function is not feasibly available that can be applied to the hashed value to generate the original value. In some embodiments, the information sent to the online system further includes information describing the form fields 410 of form 400.

Since the hash function used to generate the hashed version of the information entered by the user in the form fields 410 of form 400 is a non-invertible function, the online system 140 or another entity that is able to intercept the information sent to the online system is not be able to obtain the plain text value that was entered by the user by simply applying an inverse hash function to the hashed values. As such, transmitting a hashed version of the field values increases security of the information being transmitted and the privacy of the user.

Referring back to FIG. 2, the tracking pixel module 230 identifies a user by matching the received hashed values 470 to values stored in the user profile store 205 of the online system 140. For instance, the tracking pixel module 230 identifies that the information of FIG. 4B corresponds to user profile 310A of FIG. 3 by comparing the received hashed values 470 with values stored in the user profiles 310. That is, the tracking pixel module 230 compares the received hashed value "8868E550B9A617CD91F40C46023B4F9F02460F2F" to the hashed version of the values of the name field of user profiles 310, compares the received hashed value "8F1F38467DC2A78C05DCC98C5E0D20F0B5AEA8AA" to the hashed version of the values of the email field of user profiles 310, compares the received hashed value "163EED51EA1A1DE7792D92D89531120436330420" to the hashed version of the values of the address field of user profiles 310, compares the received hashed value "FB02CFA565A2F6062E158FA8F5FCFE17624F8B8A" to the hashed version of the values of the phone field of user profiles 310, and compares the received hashed value "0AEA7C99C24D91FB91B368873DC6A1B2ACDA7808" to the hashed version of the values of the birthday field of user profiles 310.

In some embodiments, the tracking pixel module 230 determines that the received information corresponds to a specific user profile if a threshold number of the received hashed values 470 match the information stored in the specific user profile. For example, the tracking pixel module 230 determines that the received information corresponds to a user profile if the received hashed value for the name field 470A and the received hashed value for the email field 470B match a user profile.

Figure 4C:
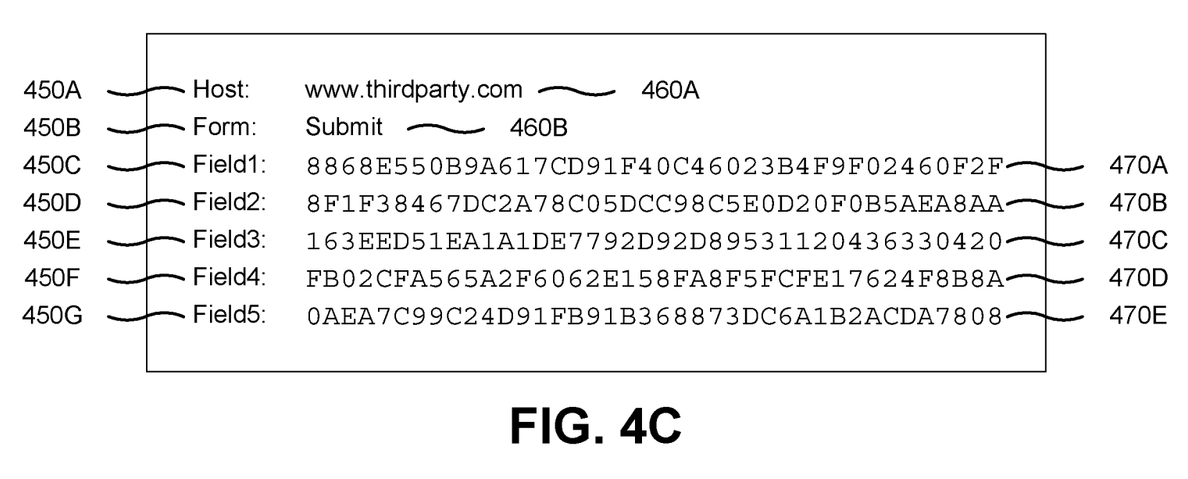
FIG. 4C illustrates a set of values sent to the online system in response to a user submitting a form in the third party system, according to another embodiment.

In some embodiments, the information received does not include a description of the fields included or the name 450 included for each of the fields are not descriptive of actual data that is expected to be entered in the form field. For example, as shown in FIG. 4C, instead of describing the fields as "Name," "Email," "Address," "Phone," and "Birthday" the fields are described as "Field1," "Field2," "Field3," "Field4," and "Field5." In this case, the tracking pixel module 230 can match the received information to the user profiles and identify the type of information included in the form. For instance, the tracking pixel module 230 searches the hashed value "8868E550B9A617CD91F40C46023B4F9F02460F2F" in the user profile store 205. The tracking pixel module 230 then identifies that the received hash value "8868E550B9A617CD91F40C46023B4F9F02460F2F" matches the hash value of the name field of user profile 310A. As such, the tracking pixel module 230 identifies that the form field "Form1" from the submit form of third party "www.thirdparty.com" corresponds to a name field. Similarly, the tracking pixel module 230 identifies that "Field2" corresponds to an email address field, "Field3" corresponds to an address field, "Field4" corresponds to a phone number field, and "Field5" corresponds to a birthday field. In some embodiments, the tracking pixel module 230 generates a form dictionary that identifies the various fields in various forms from third party systems.

In some embodiments, the form dictionary is used to aid the user in filling out online forms. The online system 140 uses information stored in the user profile store 205, which was provided by the user to the online system to suggest the user on values to input into the various fields of a form. For instance, if the online system 140 has previously identified that "Field3" is a textbox that corresponds to a field to enter an email address, the online system 140 searches the user profile store 205 for email addresses associated with the user, and suggest the user one or more identified email addresses as possible values to "Field3" textbox.

The web server 240 links the online system 140 via the network 120 to the one or more client devices 110, as well as to the one or more third party systems 130. The web server 240 serves web pages, as well as other content, such as JAVA®, FLASH®, XML, and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Improved Tracking of Third Party Website Actions

Figure 5:
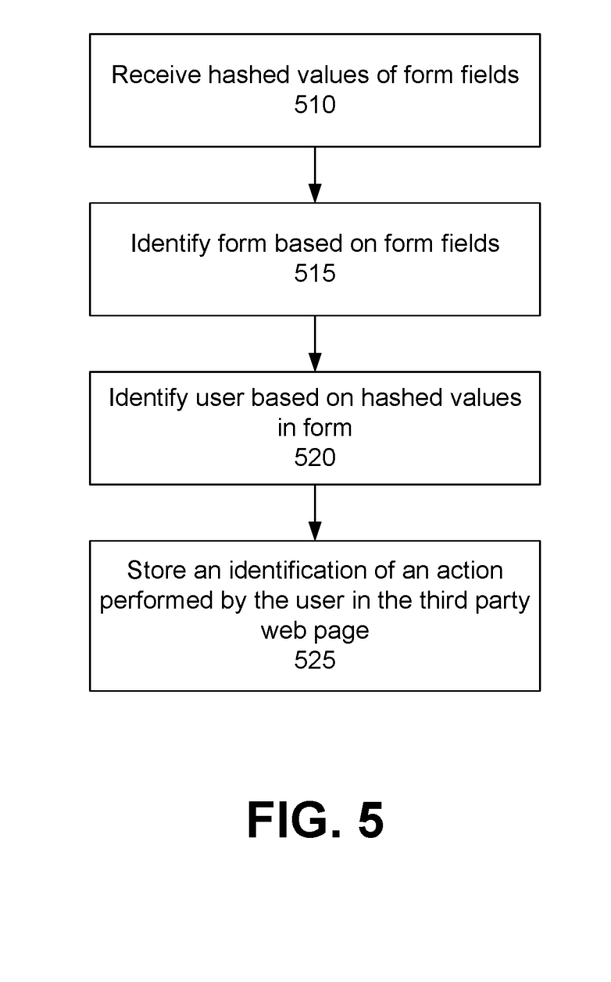
FIG. 5 illustrates a flow diagram of a process for identifying an action performed by a user in a third party system, according to one embodiment.

FIG. 5 illustrates a flow diagram of a process for identifying an action performed by a user in a third party system, according to one embodiment. The tracking pixel module 230 receives 510 hashed values of form fields. In some embodiments, the form inputs are formatted before the hash function is applied. For instance, blank characters may be deleted and upper case characters are converted to lower case characters. That is, for the name field of FIG. 3, the input "Joe Doe" may be formatted as "joedoe." In some embodiments, the formatting of the inputs is specified by the online system 140.

The tracking pixel module 230 identifies 515 the form based on the information received. In some embodiments, the tracking pixel module 230 first identifies the third party system 130 associated with the form. After identifying the third party system 130 associated with the form, the tracking pixel module 230 identifies the purpose of the form. For instance, the tracking pixel module 230 identifies that the information received is associated with a checkout form in an online marketplace.

The tracking pixel module 220 identifies 520 a user based on the received hashed values. The tracking pixel module 220 identifies a user by matching the one or more of the received hashed values with information stored in the user profile store 205.

The tracking pixel module 220 stores 525 an identification of an action performed by the user in the third party web page. In some embodiments, the tracking pixel module 220 identifies the action based on the identified form in step 515. For instance, if the form identified is a checkout page of an online marketplace, the tracking pixel module 220 stores an identification that the identified user has made a purchase in the third party system 130.

Figure 6:
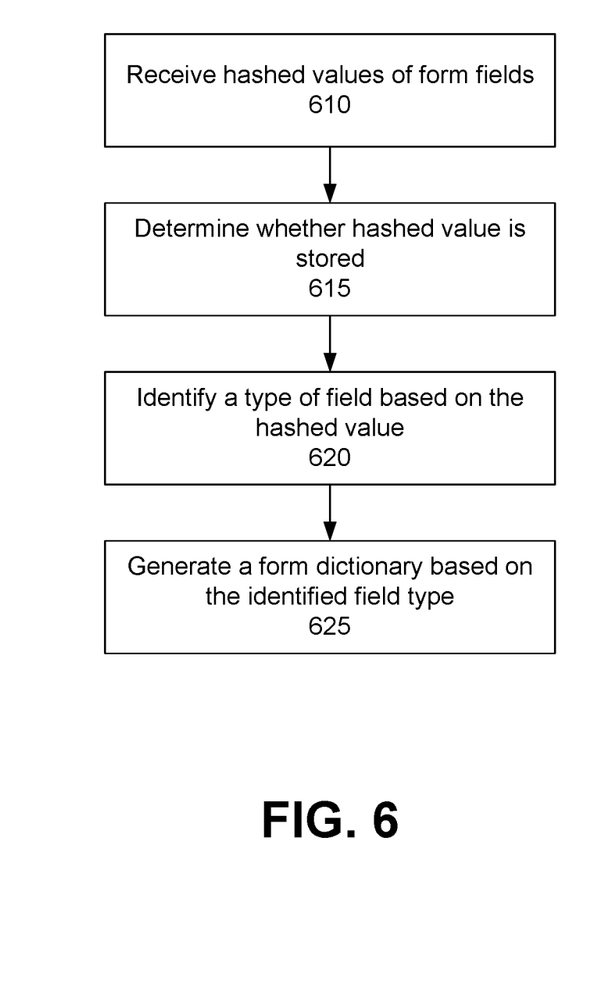
FIG. 6 illustrates a flow diagram of a process for generating a form dictionary of forms, according to one embodiment.

FIG. 6 illustrates a flow diagram of a process for generating a form dictionary of forms, according to one embodiment. The tracking pixel module 230 receives 610 hashed values of form fields. The tracking pixel module 230 then determines 615 whether the received hashed values are stored in the user profile 105 or if the received hashed values correspond to values stored in the user profile 105. If the tracking pixel module 230 determines that the received hashed values are stored in the user profile 105 or correspond to values stored in the user profile 105, the tracking pixel module 230 identifies 620 a type of field of the received hashed value based on the corresponding value stored in the user profile 105. For instance, for a received hash value of a form field named "Field2," if the corresponding stored value is an email address of a user, the tracking pixel module 230 determines that the form field named "Field2" is a textbox for users to enter their email addresses. The tracking pixel module 230 generates a form dictionary based on the identified field types.

The generated form dictionary may be used to automatically fill third party system forms or to aid a user in filling the forms of the third party system. For instance, if a user visits the third party system and is prompted to fill out the form shown in FIG. 4A, the online system 140 can use the form dictionary to identify that textbox 410A is for entering a name of the user, textbox 410B is for entering an email address of the user, textbox 410C is for entering the address of the user, etc. The online system 140 then queries the user profile store 205 to determine if the information to be entered in each of the textboxes is available for the user. If the information is available, the online system automatically fills out the form shown in FIG. 4A with the available information.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, by an online system, information associated with a form of a third party system filled out by a user, the form having a plurality of name-value pairs, the information including hashed values of a plurality of form fields provided by the user and corresponding to values of the plurality of name-value pairs of the form, and a description of the plurality of form fields corresponding to names of the name-value pairs of the form, the hashed values generated by a script run by the third party system;
identifying the form based on the description of the plurality of form fields;
determining an action performed by the user in the third party system based on the identification of the form;
determining whether one or more of the received hashed values correspond to hashed user-related information stored in the online system;
responsive to determining that one or more of the received hashed values correspond stored values, identifying the user based on the stored values corresponding to the one or more received hashed values; and
storing an identification of the action associated with the identified form performed by the user in the third party system.

2. The method of claim 1, further comprising:
receiving an identification of a user performed action in the third party system, the identification of the user performed action received responsive to a tracking pixel embedded in a webpage of the third party system; and
verifying whether the identification of the user performed action matches the identification of the action associated with the identified form.

3. The method of claim 1, wherein the description of the plurality of form fields is a name of the plurality of form fields.

4. The method of claim 1, wherein a hash function used to generate the received hashed values is non-invertible.

5. The method of claim 1, wherein determining whether one or more of the received hashed values correspond to hashed user-related information stored in the online system comprises:
comparing the one or more received hashed values to hashed versions of fields in user profiles; and
identifying a user profile that includes fields that correspond to the one or more received hashed values.

6. The method of claim 1, wherein determining whether one or more of the received hashed values correspond to hashed user-related information stored in the online system comprises:
for each user of the online system:
generating a hashed version of a subset of information stored in a user profile of the user, and
storing, in the user profile of the user of the online system, the generated hashed version of the subset of information stored in the user profile;
comparing the one or more of the received hashed values to the stored hashed versions of the subset of information stored in the user profile.

7. The method of claim 1, wherein the hashed values of the plurality of form fields provided by the user, and the description of the plurality of form fields are received in response to the user submitting the form to the third party system.

8. A non-transitory computer readable medium comprising instructions, the instructions when executed by a processor of an online system, cause the processor to:
receive information associated with a form of a third party system filled out by a user, the form having a plurality of name-value pairs, the information including hashed values of a plurality of form fields provided by the user and corresponding to values of the plurality of name-value pairs of the form, and a description of the plurality of form fields corresponding to names of the name-value pairs of the form, the hashed values generated by a script run by the third party system;
identify the form based on the description of the plurality of form fields;
determine an action performed by the user in the third party system based on the identification of the form:
determine whether one or more of the received hashed values correspond to hashed user-related information stored in the online system;
responsive to determining that one or more of the received hashed values correspond stored values, identify the user based on the stored values corresponding to the one or more received hashed values; and
store an identification of the action associated with the identified form performed by the user in the third party system.

9. The non-transitory computer readable medium of claim 8, wherein the instructions further cause the processor to:
receive an identification of a user performed action in the third party system, the identification of the user performed action received responsive to a tracking pixel embedded in a webpage of the third party system; and
verify whether the identification of the user performed action matches the identification of the action associated with the identified form.

10. The non-transitory computer readable medium of claim 8, wherein the description of the plurality of form fields is a name of the plurality of form fields.

11. The non-transitory computer readable medium of claim 8, wherein a hash function used to generate the received hashed values is non-invertible.

12. The non-transitory computer readable medium of claim 8, wherein the instructions for determining whether one or more of the received hashed values correspond to hashed user-related information stored in the online system cause the processor to:
compare the one or more received hashed values to hashed versions of fields in user profiles; and
identify a user profile that includes fields that correspond to the one or more received hashed values.

13. The non-transitory computer readable medium of claim 8, wherein the instructions for determining whether one or more of the received hashed values correspond to hashed user-related information stored in the online system cause the processor to:
for each user of the online system:
generate a hashed version of a subset of information stored in a user profile of the user, and
store, in the user profile of the user of the online system, the generated hashed version of the subset of information stored in the user profile;
compare the one or more of the received hashed values to the stored hashed versions of the subset of information stored in the user profile.

14. The non-transitory computer readable medium of claim 8, wherein the hashed values of the plurality of form fields provided by the user, and the description of the plurality of form fields are received in response to the user submitting the form to the third party system.

15. An online system comprising:
a processor; and
a non-transitory computer readable medium comprising instructions, the instructions when executed by a processor cause the processor to:
receive information associated with a form of a third party system filled out by a user, the form having a plurality of name-value pairs, the information including hashed values of a plurality of form fields provided by the user and corresponding to values of the plurality of name-value pairs of the form, and a description of the plurality of form fields corresponding to names of the name-value pairs of the form, the hashed values generated by a script run by a third party system,
identify the form based on the description of the plurality of form fields;
determine an action performed by the user in the third party system based on the identification of the form,
determine whether one or more of the received hashed values correspond to hashed user-related information stored in the online system,
responsive to determining that one or more of the received hashed values correspond stored values, identify the user based on the stored values corresponding to the one or more received hashed values, and
store an identification of the action associated with the identified form performed by the user in the third party system.

16. The online system of claim 15, wherein the instructions further cause the processor to:
receive an identification of a user performed action in the third party system, the identification of the user performed action received responsive to a tracking pixel embedded in a webpage of the third party system; and
verify whether the identification of the user performed action matches the identification of the action associated with the identified form.

17. The online system of claim 15, wherein hashed hash function used to generate the received hashed values is non-invertible.

18. The online system of claim 15, wherein the instructions for determining whether one or more of the received hashed values correspond to hashed user-related information stored in the online system cause the processor to:

compare the one or more received hashed values to hashed versions of fields in user profiles; and identify a user profile that includes fields that correspond to the one or more received hashed values.

19. The online system of claim 15, wherein the instructions for determining whether one or more of the received hashed values correspond to hashed user-related information stored in the online system cause the processor to:

for each user of the online system:
- generate a hashed version of a subset of information stored in a user profile of the user, and
- store, in the user profile of the user of the online system, the generated hashed version of the subset of information stored in the user profile;

compare the one or more of the received hashed values to the stored hashed versions of the subset of information stored in the user profile.

20. The online system of claim 15, wherein the hashed values of the plurality of form fields provided by the user, and the description of the plurality of form fields are received in response to the user submitting the form to the third party system.

* * * * *